Nov. 25, 1941.   E. L. OLIVER ET AL   2,263,852
FILTER
Filed Nov. 30, 1939   3 Sheets-Sheet 2
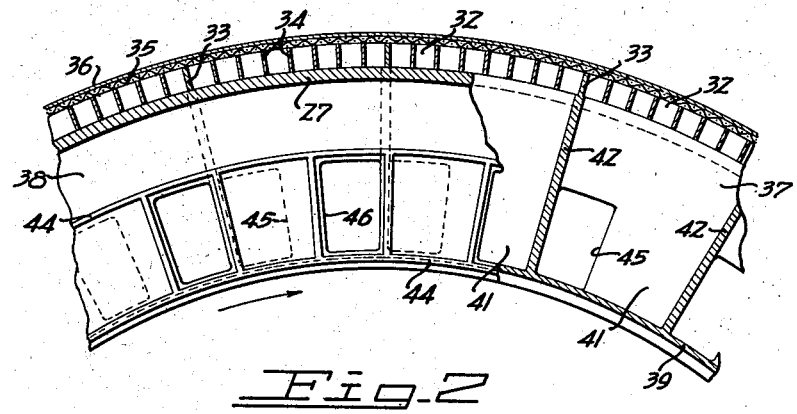
Fig. 2
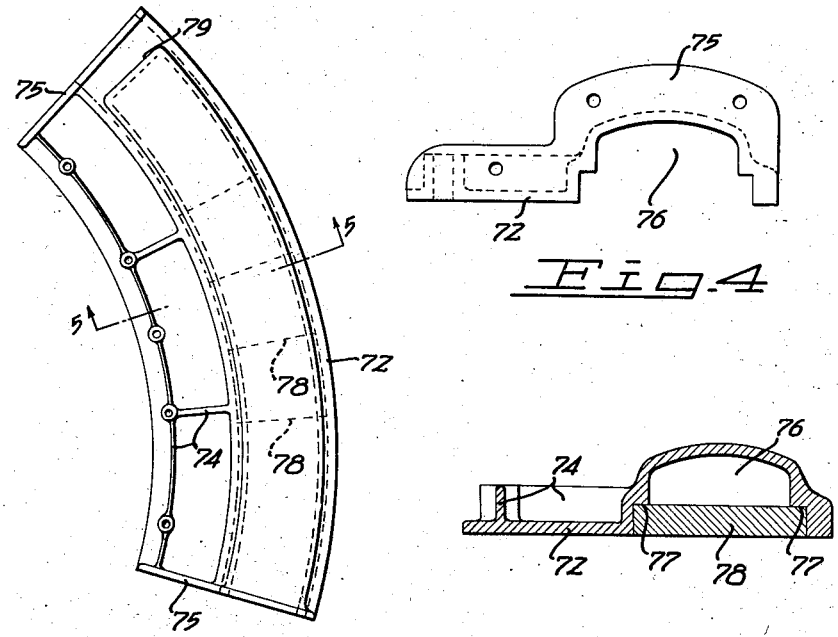
Fig. 3
Fig. 4
Fig. 5
INVENTORS
EDWIN L. OLIVER
EDWARD D. FLYNN
BY ORVILLE B. ACKERLY JR.
ATTORNEY

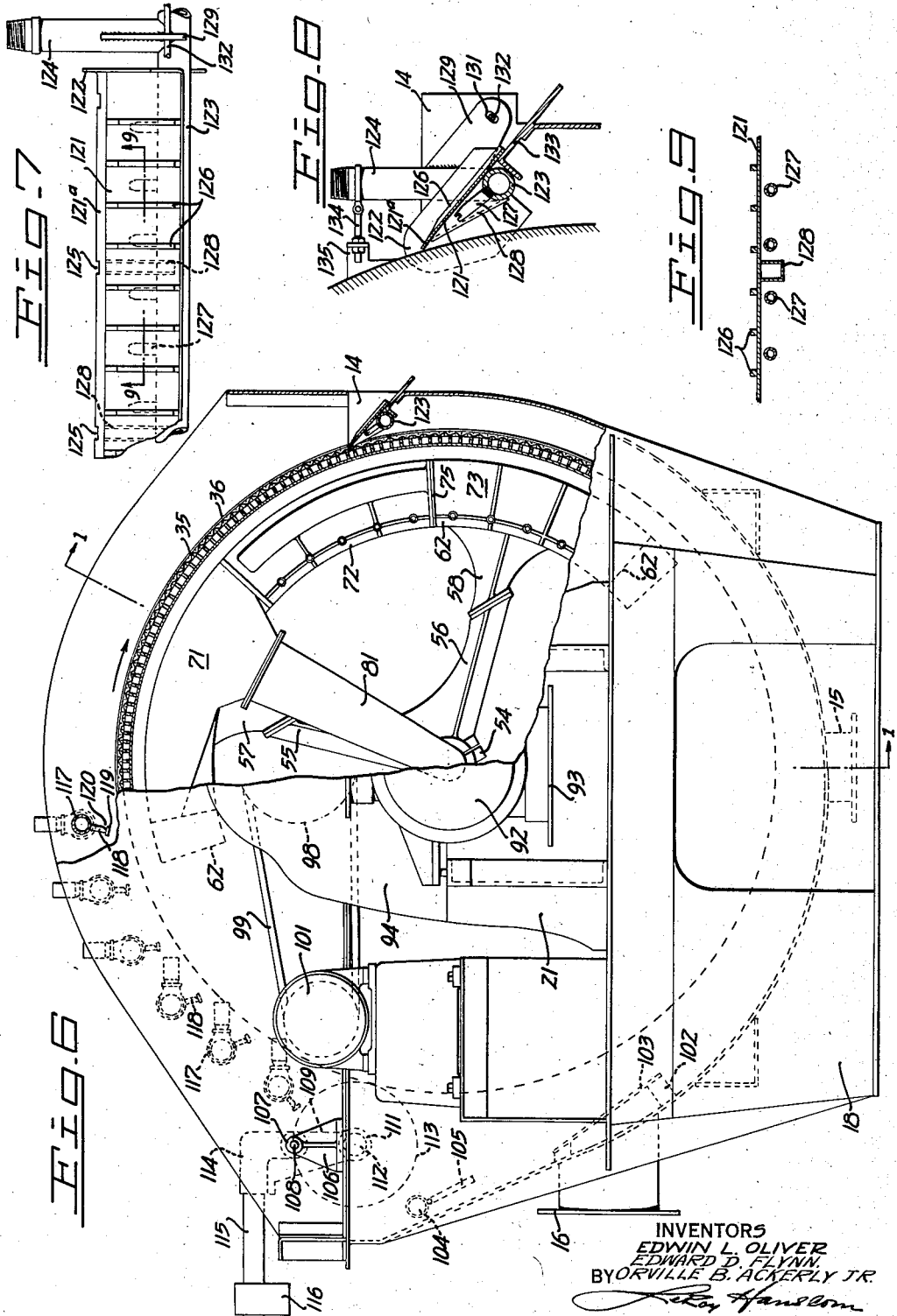

Patented Nov. 25, 1941

2,263,852

UNITED STATES PATENT OFFICE 2,263,852

FILTER

Edwin L. Oliver, Piedmont, Edward D. Flynn, Oakland, and Orville B. Ackerly, Jr., Piedmont, Calif., assignors to Oliver United Filters Incorporated, Oakland, Calif., a corporation of Nevada Application November 30, 1939, Serial No. 306,914

15 Claims. (Cl. 210—199)

This invention relates in general to continuous rotary drum filters and more particularly to filters of this type capable of handling large volumes of liquor.

Filtration on any type of filter requires the use of a differential filtering pressure. To discharge more readily the cake formed as a result of the filtering operation, this differential pressure should be relieved. In the standard form of continuous filters now in use, the imposition of a differential filtering pressure during the so-called "pick-up" or cake forming cycle and the release of this pressure during the discharge cycle are effected by an automatic valve communicating through suitable piping with the various filtrate compartments of the filter. For certain filtration operations such as the washing of paper pulp on continuous rotary rum filters, this piping may be dispensed with by simply maintaining a differential filtering pressure between the exterior and interior of the drum except at that portion of the drum from which the cake is being discharged.

One of the objects of this invention is the provision in the sectionalized drum of a continuous rotary drum filter, of peripherally aligned ported pockets depending from each of the drum sections or compartments and arranged to register with a stationary shoe once during each revolution of the drum.

Another object of this invention is the provision in the drum of a rotary drum filter of a stationary shoe arranged to cut off communication between the interior of the drum and successive filter sections, and provided with a compartment for effecting a separation between the filtrate per se and the liquor used to wash the cake deposited on the drum.

Another object of this invention is the provision in the sectionalized drum of a rotary drum filter, of a stationary shoe adapted to concurrently cut off communication between the interior of the drum and two or more of its sections or compartments, and provided with a by-pass by which communication may be established between two or more of the compartments in registration with the shoe.

A further object of this invention is the provision in a rotary drum filter of a cake discharge mechanism external to the drum and by means of which a fluid pressure may be created beneath the cake to lift it from the filter medium.

A still further object of the invention is the provision of a novel means of so feeding pulp or slurry to the tank of a continuous filter that a more uniform density of the pulp within the tank is maintained.

Another object of the invention is the provision in a continuous filter of a spray mechanism for subjecting the pulp carried on the drum of a rotary drum filter to a spray wash.

Another object of this invention is the provision in a rotary drum filter of a press roll located along the ascending side of the drum substantially at the liquor level for the purpose of compacting the cake at this point to prevent it from sloughing off the drum.

The invention possesses other advantageous features, some of which with the foregoing will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in a plurality of forms.

Referring to the drawings:

Figure 2 is an enlarged section taken on the line 2—2 of Figure 1.

Figure 3 is a side elevation of one of the stationary shoes used to close successively the ports of the filtrate compartments as shown in Figure 2.

Figure 4 is an end elevation of the shoe shown in Figure 3.

Figure 5 is a section taken on the line 5—5 of Figure 3.

Figure 6 is an end elevation of the filter shown in Figure 1 with a portion of the end of the tank broken away and with a portion of the drum in section, the better to illustrate its construction and operation.

Figure 7 is a partial side elevation of the doctor used for discharging the cake from the filter shown in Figures 1 and 6.

Figure 8 is a transverse section taken through the doctor shown in Figure 7.

Figure 9 is a section taken on the line 9—9 of Figure 7.

Figure 1:
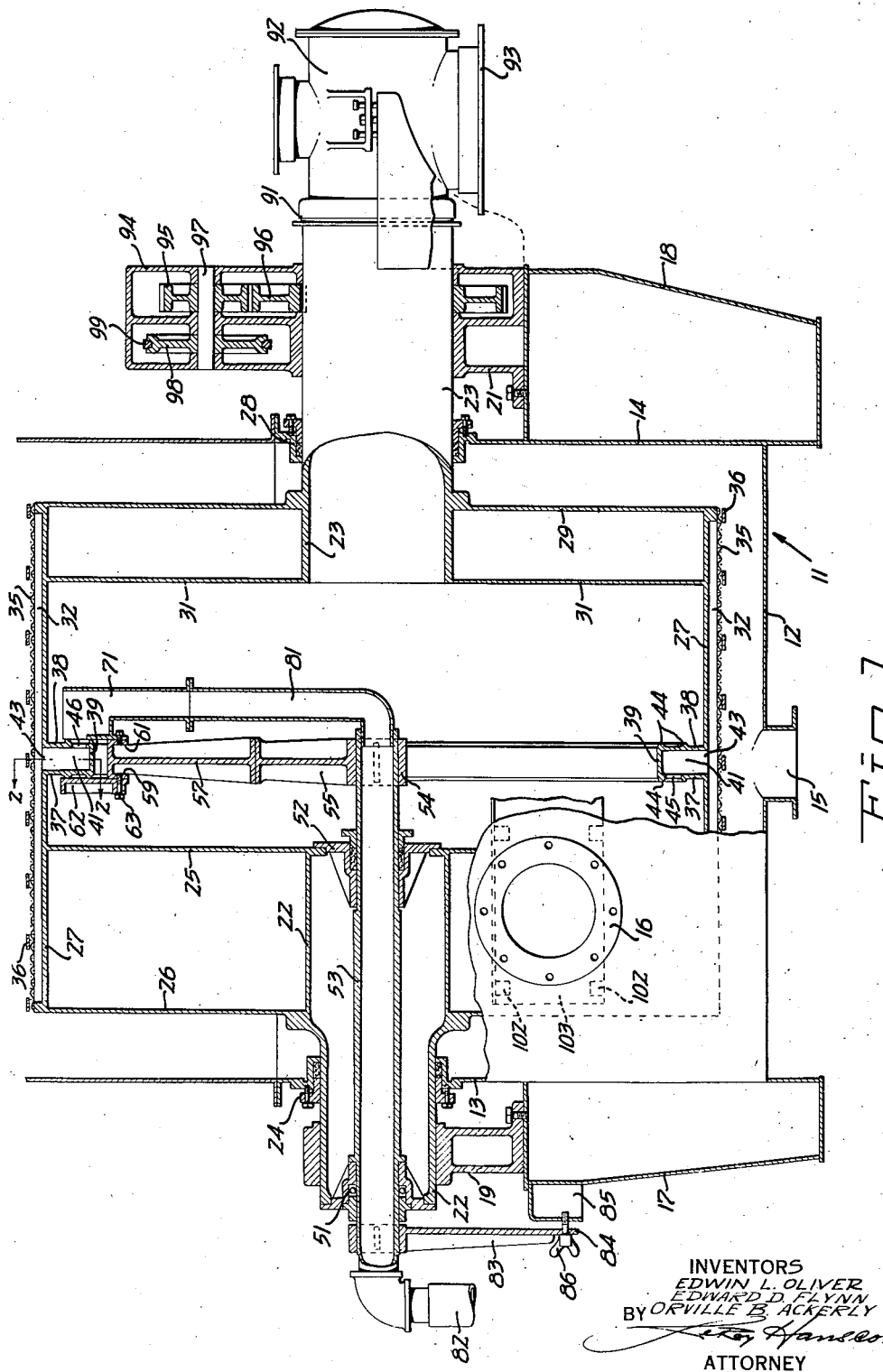
Figure 1 is a longitudinal, vertical midsection of a rotary drum filter embodying the objects of my invention and taken on the line 1—1 of Figure 6.

As shown in these various figures, the objects of our invention are embodied in a rotary drum filter comprising a tank generally designated by the reference numeral 11 and consisting of a semi-cylindrical shell 12 closed at its ends by tank heads 13 and 14 welded thereto. Extending downwardly from the bottom of the shell 12 is a flanged drainage port 15, and extending outwardly from the shell 12 adjacent the rising side of the drum are a plurality of longitudinally spaced flanged intake ports 16 (Figures 1 and 6).

The tank 11 is carried by pedestals 17 and 18 formed integral with the tank heads and these pedestals support longitudinally spaced bearings 19 and 21 for the reception of coaxial hollow trunnions 22 and 23.

The trunnion 22 passes through a stuffing box 24 associated with the tank head 13 and is secured at its inner end to a dummy drum head 25. Secured to the trunnion 22 intermediate its ends is a drum head 26 welded or bolted to a drum 27. The dummy drum head 25 is likewise welded or otherwise secured at its periphery to the drum 27.

In the same manner the hollow trunnion 23 passes through a stuffing box 28 associated with the tank head 14 and is secured to a drum head 29 and to a dummy drum head 31, and these two latter members are in turn secured to the drum 27.

Formed on the periphery of the drum 27 are a plurality of filtrate sections or compartments 32 defined by peripherally spaced longitudinally extending division strips 33. Disposed within each of the compartments so formed is a drainage member and supporting screen consisting of a plurality of peripherally spaced longitudinally extending strips 34. Over the structure so formed is wrapped a filter medium 35 which in the present instance is in the form of a woven wire cloth and is held in place by a plurality of longitudinally spaced Acme bands 36.

Welded around the inner surface of the drum 27 intermediate its ends are a pair of spaced annular rings 37 and 38, and welded to the edges of these rings is a band 39 which with the rings forms an annular trough circumscribed by the drum 27. The annular trough so formed is divided into a plurality of valve bodies or pockets 41 by radial walls or partitions 42 extending inwardly as partial extensions of the division strips 33, and communication between each of the pockets 41 and the filtrate compartment immediately above it is effected by a port 43 formed in the drum 27. The annular rings 37 and 38 constituting the side walls of the pockets 41 are formed on their outer faces with spaced annular machined valve seats 44. Assuming that the drum 27 is designed to rotate clockwise as indicated in Figures 2 and 6, each of the pockets 41 communicates with the cylindrical chamber defined by the drum 27 and the dummy drum heads 25 and 31, through a port 45 formed in the ring 37 adjacent the trailing end of the pocket and through a port 46 formed in the ring 38 adjacent the leading end of the pocket. This construction therefore permits liquor to pass into the drum through the ports 46 on the rising side of the drum and through ports 45 on the descending side of the drum, taking full advantage of the action of gravity. Furthermore, by making the peripheral length of these ports relatively short, each port as it engages a cut-off shoe to be presently described can be closed in a relatively short interval of time, thereby making possible a sharper separation of filtrate and wash water when that is desired.

Extending through a bearing 51 associated with the outer end of the hollow trunnion 22 and through a stuffing box 52 associated with the inner end of this trunnion is a hollow shaft 53. Bolted to the inner end of the hollow shaft 53 in peripheral alignment with the pockets 41 is a split collar 54 formed with a pair of radially extending flanged spokes or brackets 55 and 56, and bolted to these brackets are extensions 57 and 58. The outer ends of these extensions are provided on one side with flanges 59 and on the other side with flanges 61. The faces of these flanges are co-planar with the valve seats 44 formed on the annular rings 37 and 38.

Bridging the left hand side of the extensions 57 and 58 as viewed in Figure 1 is an arcuate shoe consisting of three identical shoe sections 62 bolted together by end flanges and secured to the extensions 57 and 58 by bolts 63 passing through the two end sections 62 and the flanges 59. The inner surface of the shoe formed by these identical sections is finished on its inner face and is designed to close off each of the ports 45 once during each revolution of the drum. As shown in Figure 6, this shoe subtends an arc of about 150°, the upper section 62 extending well to the left of the vertical center line of the drum and the lower section 62 terminating about 45° below the horizontal center line of the drum on its descending side. The shoe is made in sections of such dimensions that they can be introduced into the drum through the hollow trunnion 23 and for the same reason all other parts associated with the shoe and not formed integral with the interior of the drum are either made in sections or are sufficiently small to pass through this trunnion.

The ports 46 formed on the leading ends of the pockets 41 (Figures 1 and 2) successively register with or contact an arcuate wash water chamber 71, an arcuate by-pass shoe section 72, and a plain arcuate shoe section 73 identical with the shoe sections 62 (Figure 6). As shown in Figure 1, the wash water chamber 71 is bolted to the flange 61 of the extension 57 and in a similar manner the shoe section 73 is bolted to a similar flange formed on the extension 58 (Figure 6). The by-pass shoe section 72 is bolted to the inner ends of the shoe section 73 and the wash water chamber 71, thereby forming a continuous integral arcuate structure therewith. The external faces of the shoe sections are formed with ribs 74 for strength and with end flanges 75 for bolting the sections together.

The by-pass shoe section 72, as shown in Figures 3, 4, and 5, is formed on its inner face with an arcuate channel or by-pass 76, and machined along the sides of this channel are block seats 77 designed to accommodate one or more bridging blocks 78. The channel 76 extends through the lower end of the section 72 but terminates at a point 79 just short of the upper end of the section so that communication between the channel and the wash water chamber 71 is prevented. The by-pass shoe section 72 is designed to be located just opposite that portion of the drum from which the cake is to be discharged and subtends about three of the filtrate compartments 32, as also do the wash water chamber 71 and the other shoe sections. It will therefore be seen that the by-pass or channel 76 in bridging two or more of the ports 46 of the pockets 41 can be used to establish communication with a discharged filtrate compartment 32 and one or more succeeding compartments which are approaching their discharge position. This then serves as a means for equalizing the pressure between the interior and exterior of each compartment just prior to the time that each compartment reaches its discharge position, thereby permitting an easier and more effective discharge of the cake carried thereon. The bridging blocks 78 can be used to control the volume of air passing through the by-pass and the number of filtrate compartments to be affected.

It will be noted that as shown in Figure 6, the shoe section 73 and its opposed shoe section 62 are below the level of the intake ports 16. The purpose of these shoe sections is therefore to keep the ports 45 and 46 closed between the discharge point and the point of submergence so that a differential filtering pressure can be maintained between the exterior and interior of the drum.

The purpose of subjecting many pulps and slurries to filtration is to wash the pulp or slurry free of chemical solutions. Paper pulps, for example, must be free of acids or alkalies before they can be used in the manufacture of paper. The economy of the process, however, demands that these chemicals be recovered for re-use, and since this is ordinarily done by evaporation, it is desirable to avoid dilution of the filtrate. In the filter disclosed herein the filtrate per se passes directly into the interior of the drum, whereas the wash water applied to the drum by spray nozzles to be presently described, passes into the wash water chamber 71. To effect a sharp separation of the filtrate and wash water, the ports 45 and 46 in the valve bodies or pockets 41 are made relatively narrow and are staggered, the ports 45 being formed on the trailing end of each pocket and the ports 46 being formed on the leading end. It is for this reason that as shown in Figure 6, the leading end of the leading shoe section 73 is slightly in advance of the opposed leading shoe section 62.

Briefly, then, the valve construction associated with the interior of the drum comprises a plurality of peripherally aligned laterally ported valve bodies or pockets depending from and communicating with the filtrate compartments formed on the surface of the drum. These valve bodies are arranged to rotate through a fixed arcuate channel formed on one side by three identical shoe sections and on the other side first by a wash water chamber, then a by-pass shoe section, and finally by a plain shoe section. As each compartment emerges from the tank its contained filtrate passes through the leading port 46, and as each filtrate compartment approaches its zenith, the port 45 of its associated valve body or pocket 41 is closed by the trailing shoe section 62 and the wash water passing through the filtrate compartment passes through the port 46 into the wash water chamber 71. Upon passing beyond the chamber 71, the by-pass in the shoe section 72 equalizes the pressure on the interior and exterior of the compartment as it approaches its point of discharge. Finally after each compartment is discharged of its cake, the trailing shoe sections close both ports 45 and 46 until the compartment is again submerged in the pulp, whereupon the filtrate is free to pass through these ports into the interior of the drum.

As shown in Figures 1 and 6, the wash water chamber communicates with the hollow shaft 53 through a pipe 81 connected therewith. The outer end of the shaft is connected to a pipe or hose 82 which in turn may be connected with a barometric leg or other suitable source of vacuum, not illustrated.

For the purpose of angularly adjusting the shoes and wash water chamber, an adjusting lever 83 is keyed to the outer end of the shaft 53. The lever 83 terminates in an arcuately slotted quadrant 84 which may be fixed to a bracket 85 carried by the pedestal 17 in any angular position by means of a screw 86.

The inner end of the right hand trunnion 23 is open as shown in Figure 1 and its outer end is connected through a stuffing box 91 with a fitting 92 formed with a flange 93 by which this fitting may be connected, for example to a barometric leg or vacuum receiver, not shown.

Formed integral with the bearing 21 is a gear housing 94 containing a gear 95 in mesh with a bull gear 96 keyed to the trunnion 23. The gear 95 is keyed to a shaft 97 and the shaft 97 carries a pulley 98 driven through a belt 99 by an electric motor 101 supported on the tank frame or other suitable support.

Extending longitudinally within the filter tank and held in spaced relation with the intake ports 16 by lugs 102 is a baffle plate 103. The purpose of this baffle plate is to prevent a direct current of pulp towards the filter drum and to cause the pulp on entering the tank to pass downwardly below the baffle and then upwardly in contact with the rising side of the drum. By this action the cake formed on the drum is prevented from sloughing off as it approaches the pulp level.

Disposed within the filter tank on the rising side of the drum is a longitudinally extending manifold 104 carrying a plurality of downwardly directed longitudinally spaced nozzles 105, through which water or other fluid may be introduced to augment the action of the baffle plate 103.

Supported by the tank heads 13 and 14 on the rising side of the drum are brackets 106 formed with bearings 107. Journaled in these bearings are pins 108 to which are keyed depending straps 109 terminating in bearings 111. Journaled in the bearings 111 is a longitudinally extending shaft 112 on which is mounted a press roll 113 arranged to contact and compact the cake carried on the filter drum. Also keyed to the pins 108 are elbows 114 (one at either end of the filter) to which are secured arms 115. Carried by the arms 115 are counterweights 116 by means of which the pressure of the roll 113 against the filter drum may be controlled.

Disposed above the rising side of the drum and extending between the tank heads 13 and 14 are a plurality of wash water manifolds 117, each provided with a plurality of longitudinally spaced spray nozzles 118. The outer ends of the nozzles are closed by a head 119 and are formed with an inwardly cut orifice 120 so that they will produce a fan-shaped spray, and the nozzles are so spaced that the spray from one orifice will overlap the spray from its laterally adjacent orifice.

The cake formed on the filter drum after being subjected to a spray wash is discharged by means of a doctor provided on its lower side with a plurality of inwardly directed nozzles. The tip of the doctor is downwardly inclined and serves to direct a current of steam or other fluid passing through the nozzles, downwardly into the filtrate compartments immediately in advance of the sheet of cake or solids to be discharged. Upon entering the filtrate compartment the steam creates an outward pressure which lifts the sheet away from the filter medium and allows it to pass outwardly over the surface of the doctor. To prevent the formation of a partial vacuum between the sheet and the doctor the upper face of the doctor is provided with a plurality of longitudinally spaced ribs which hold the sheet out of strict surface contact with the face of the doctor.

As shown in Figures 7, 8, and 9, the doctor comprises a longitudinally extending plate 121 having a downwardly inclined lip 121ᵃ and formed at either end with upstanding side members 122. Carried by these side members at their outer ends and below the plate 121 is a longitudinally extending manifold 123 connected at each end to an upstanding intake pipe 124. The lip 121ᵃ of the plate 121 is formed with a plurality of spaced notches 125 for accommodating the longitudinally spaced Acme bands 36 secured over the filter medium 35. Disposed over the upper face of the plate 121 are a plurality of ribs 126 for maintaining the cake out of strict surface contact with the plate 121. Extending inwardly from the manifold 123 immediately below and parallel with the plate 121 are a plurality of longitudinally spaced nozzles 127, preferably terminating somewhat short of the lip 121ᵃ but in alignment therewith. To prevent the steam jets from the nozzles 127 from taking the path of least resistance through the notches 125, the lower side of the plate 121 is provided with transverse baffles 128 on either side of each notch. In order to stiffen the plate 121, these baffles have been made in the form of channels and are welded at their outer ends to the manifold 123 as well as over their entire length to the lower side of the plate 121. In side elevation, these channels are wedge shaped, tapering from their outer ends to their inner ends. Welded to each of the upstanding intake pipes 124 in a vertical plane is a wing 129 formed at its outer end with a slot 131. The doctor in its entirety is designed to be supported between the tank heads 13 and 14 by pins 132 carried by the tank heads and extending through the slots 131, with the outer end of the plate 121 resting on a downwardly flanged seat 133 welded to the tank. If, however, it is desired to adjust the inclination of the doctor, this can be done by means of a bolt 134 pivotally secured to one of the intake pipes 124 and passing through a lug 135 carried by the tank head. To swing the doctor away from its operative position and from its seat, it is merely necessary to move it upwardly and outwardly along the slot 131.

Steam is preferably used as a discharging medium for the reason that some pulps such as paper pulp, carry an appreciable quantity of gums and resins which adhere to the filter medium and Acme bands and which can be readily dissolved by steam.

We claim:

1. A filter comprising: a rotary drum closed at both ends and arranged to contact a body of liquid to be filtered; a plurality of longitudinally disposed filtrate compartments formed on the surface of said drum and covered with a filter medium; peripherally aligned valve bodies communicating with said filtrate compartments and depending into and communicating with the interior of said drum; a port formed on each side of each valve body; a pair of stationary shoes disposed within said drum immediately adjacent the sides of said valve bodies and arranged to close said ports once during each revolution of said drum; a cake discharge device mounted adjacent the outer surface of said drum at a point opposite said shoes; and means for maintaining a differential filtering pressure between the exterior and interior of said drum.

2. A filter comprising: a rotary drum arranged to contact a body of liquid to be filtered; a plurality of longitudinally disposed filtrate compartments formed on the surface of said drum and covered with a filter medium; peripherally aligned valve bodies depending from and communicating with said filtrate compartments, the opposed sides of said valve bodies defining a pair of opposed surfaces of revolution upon the rotation of said drum; a port formed on the leading edge of one side of each valve body and a port formed on the trailing edge of the other side of each valve body; a pair of stationary shoes disposed within said drum immediately adjacent the sides of said valve bodies and arranged to close their said ports once during each revolution of said drum; a cake discharge device mounted adjacent the outer surface of said drum at a point opposite said shoes; and means for maintaining a differential filtering pressure between the exterior and interior of said drum.

3. A filter comprising: a rotary drum closed at both ends and arranged to contact a body of liquid to be filtered; a plurality of longitudinally disposed filtrate compartments formed on the surface of said drum and covered with a filter medium; peripherally aligned valve bodies communicating with said filtrate compartments and depending into and communicating with the interior of said drum; a port formed on each side of each valve body; a member extending through one end of said drum along its axis; a pair of spaced shoes carried by said member in peripheral alignment with and arranged to straddle said valve bodies so as to close each port therein once during each rotation of said drum; and means for maintaining a differential filtering pressure between the exterior and interior of said drum.

4. A filter comprising: a rotary drum closed at both ends and arranged to contact a body of liquid to be filtered; a plurality of longitudinally disposed filtrate compartments formed on the surface of said drum and covered with a filter medium; peripherally aligned valve bodies communicating with said filtrate compartments and depending into and communicating with the interior of said drum; a port formed on one side of each valve body; a hollow shaft extending through one side of said drum; a shoe supported by said shaft in peripheral alignment with the ports in said valve bodies and arranged to close each of said ports once during each revolution of said drum; a conduit carried by and in communication with said shaft, the outer end of said conduit being in peripheral alignment with the ports in said valve bodies so as to establish communication between each of said ports and said conduit once during each revolution of said drum; and means for maintaining a differential filtering pressure between the exterior and interior of said drum.

5. A filter comprising: a rotary drum arranged to contact a body of liquid to be filtered; a plurality of longitudinally disposed filtrate compartments formed on the surface of said drum and covered with a filter medium; peripherally aligned valve bodies depending from and communicating with said filtrate compartments; a port formed on one side of each valve body, said ports lying on a common surface of revolution; a stationary shoe disposed within said drum for concurrently subtending at least two of said ports, said shoe being located adjacent that portion of the drum from which the cake formed thereon is to be discharged; a by-pass associated with said shoe and arranged to establish communication between two of said subtended ports; and means for maintaining a differential pressure between the exterior and interior of said drum.

6. A filter comprising: a rotary drum arranged to contact a body of liquid to be filtered; a plurality of longitudinally disposed filtrate compartments formed on the surface of said drum and covered with a filter medium; peripherally aligned valve bodies depending from and communicating with said filtrate compartments; a port formed on one side of each of said valve bodies, said ports lying on a common surface of revolution; a hollow shaft extending through one end of said drum; a stationary shoe supported by said shaft for concurrently subtending at least two of said ports, said shoe being located adjacent that portion of the drum from which the cake formed thereon is to be discharged; a by-pass associated with said shoe and arranged to establish communication between two of said subtended ports; a stationary chamber disposed within said drum adjacent the locus of said ports and in communication with said hollow shafts; and means for maintaining a differential pressure between the exterior and interior of said drum.

7. A filter comprising: a rotary drum arranged to contact a body of liquid to be filtered; a plurality of longitudinally disposed filtrate compartments formed on the surface of said drum and covered with a filter medium; peripherally aligned valve bodies depending from and communicating with said filtrate compartments; a port formed on one side of each valve body, said ports lying on a common surface of revolution; a stationary shoe disposed within said drum for concurrently subtending at least two of said ports, said shoe being located adjacent that portion of the drum from which the cake formed thereon is to be discharged; a by-pass associated with said shoe having an open channel arranged to establish communication between two of said subtended ports; means for blanking off any desired portion of said channel; and means for maintaining a differential pressure between the exterior and interior of said drum.

8. In a continuous filter including a filter cell arranged to travel in a closed path, a doctor comprising: a plate mounted adjacent and transversely to the path of travel of said filter cell; a manifold extending longitudinally along the lower face of said plate; and a plurality of spaced nozzles connected to said manifold and aligned with the lower forward surface of said plate so that jets from said nozzles will be deflected downwardly from said lower forward surface.

9. In a continuous filter including a filter cell arranged to travel in a closed path, a doctor comprising: a plate mounted adjacent and transversely to the path of travel of said filter cell; a manifold extending longitudinally along the lower face of said plate; a plurality of spaced nozzles connected to said manifold and aligned with the lower forward surface of said plate so that jets from said nozzles will be deflected downwardly from said lower forward surface; and a plurality of spaced ribs formed on the upper surface of said plate and extending transversely thereof.

10. A filter comprising: a slurry tank; aligned hollow trunnion bearings associated with each end of said tank; a trunnion journaled in each of said bearings and extending inwardly thereof; an outer drum head secured to each of said trunnions intermediate the ends thereof; a dummy drum head secured to the inner end of each of said trunnions; a filter drum secured to said outer and dummy drum heads, said drum and dummy drum heads defining a central filtrate compartment; a plurality of longitudinally disposed filtrate cells formed on the surface of said drum and covered with a filter medium; peripherally aligned valve bodies depending from said filtrate cells and communicating with said central filtrate compartment; a port formed on each side of each valve body; a shaft bearing carried by each end of one of said trunnions; a shaft journaled in said shaft bearings; a pair of spaced shoes carried by said shaft in peripheral alignment with and arranged to straddle said valve bodies so as to close each port therein once during each revolution of said drum; and means for maintaining a differential filtering pressure between the exterior and interior of said drum.

11. A filter comprising: a slurry tank; aligned hollow trunnion bearings associated with each end of said tank; a trunnion journaled in each of said bearings and extending inwardly thereof; an outer drum head secured to each of said trunnions intermediate the ends thereof; a dummy drum head secured to the inner end of each of said trunnions; a filter drum secured to said outer and dummy drum heads, said drum and dummy drum heads defining a central filtrate compartment; a plurality of longitudinally disposed filtrate cells formed on the surface of said drum and covered with a filter medium; peripherally aligned valve bodies depending from said filtrate cells and communicating with said filtrate compartment; a port formed on each side of each valve body; a shaft bearing carried by each end of one of said trunnions; a hollow shaft journaled in said shaft bearings; a pair of spaced shoes fixed to said shaft in peripheral alignment with and arranged to straddle said valve bodies so as to close each port therein once during each revolution of said drum; a conduit carried by and communicating at one end with said hollow shaft and having its other end in peripheral alignment with the ports in said valve bodies at a point above the normal liquor level in said filtrate compartment so as to establish communication between each of said ports and said hollow shaft at this point once during each revolution of said drum; and means for maintaining a differential filtering pressure between the exterior and interior of said drum.

12. A filter comprising: a rotary drum closed at both ends and arranged to contact a body of liquid to be filtered; a plurality of longitudinally disposed filtrate compartments formed on the surface of said drum and covered with a filter medium; peripherally aligned valve bodies depending from and communicating with said filtrate compartments; a port formed on one side of each valve body for permitting filtrate to pass from said filtrate compartments into said drum, said ports lying on a common surface of revolution; a stationary shoe disposed within said drum at a point above the normal filtrate level therein for concurrently subtending at least two of said ports; a by-pass associated with said shoe and arranged to establish communication between two of said subtended ports; and means for maintaining a differential pressure between the exterior and interior of said drum.

13. A filter comprising: a rotary drum arranged to contact a body of liquid to be filtered; a plurality of longitudinally disposed filtrate compartments formed on the surface of said drum and covered with a filter medium; peripherally aligned valve bodies depending from and communicating with said filtrate compartments; a port formed on one side of each valve body, said ports lying on a common surface of revolution; a stationary shoe disposed within said drum for concurrently subtending at least two of said ports; a by-pass associated with said shoe and arranged to establish communication between two of said subtended ports; and means for maintaining a differential pressure between the exterior and interior of said drum.

14. A filter comprising: a rotary drum arranged to contact a body of liquid to be filtered; a plurality of longitudinally disposed filtrate compartments formed on the surface of said drum and covered with a filter medium; peripherally aligned valve bodies depending from and communicating with said filtrate compartments; a port formed on one side of each of said valve bodies, said ports lying on a common surface of revolution; a hollow shaft extending through one end of said drum; a stationary shoe supported by said shaft for concurrently subtending at least two of said ports; a by-pass associated with said shoe and arranged to establish communication between two of said subtended ports; a stationary chamber disposed within said drum adjacent the locus of said ports and in communication with said hollow shaft; and means for maintaining a differential pressure between the exterior and interior of said drum.

15. A filter comprising: a rotary drum arranged to contact a body of liquid to be filtered; a plurality of longitudinally disposed filtrate compartments formed on the surface of said drum and covered with a filter medium; peripherally aligned valve bodies depending from and communicating with said filtrate compartments; a port formed on one side of each valve body, said ports lying on a common surface of revolution; a stationary shoe disposed within said drum for concurrently subtending at least two of said ports; a by-pass associated with said shoe having an open channel arranged to establish communication between two of said subtended ports; means for blanking off any desired portion of said channel; and means for maintaining a differential pressure between the exterior and interior of said drum.

EDWIN L. OLIVER.
EDWARD D. FLYNN.
ORVILLE B. ACKERLY, Jr.